(12) United States Patent
Abe et al.

(10) Patent No.: US 11,892,755 B2
(45) Date of Patent: *Feb. 6, 2024

(54) LENS UNIT AND IMAGING DEVICE

(71) Applicant: FUJIFILM Corporation, Tokyo (JP)

(72) Inventors: Takeya Abe, Saitama (JP); Keito Kamio, Saitama (JP); Ryosuke Nagami, Saitama (JP); Shinichiro Fujiki, Saitama (JP); Kazuaki Okamori, Saitama (JP); Yuya Sakai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,847

(22) Filed: Feb. 2, 2023

(65) Prior Publication Data
US 2023/0185167 A1 Jun. 15, 2023

Related U.S. Application Data

(63) Continuation of application No. 17/206,133, filed on Mar. 19, 2021, now Pat. No. 11,609,484, which is a continuation of application No. PCT/JP2019/035071, filed on Sep. 5, 2019.

(30) Foreign Application Priority Data

Sep. 27, 2018 (JP) .................. 2018-182326

(51) Int. Cl.
*G03B 17/14* (2021.01)
*G02B 7/10* (2021.01)
*H04N 23/51* (2023.01)
*H04N 23/55* (2023.01)

(52) U.S. Cl.
CPC ............. *G03B 17/14* (2013.01); *G02B 7/10* (2013.01); *H04N 23/51* (2023.01); *H04N 23/55* (2023.01)

(58) Field of Classification Search
USPC .......................................... 399/218; 396/133
See application file for complete search history.

(56) References Cited

U.S. PATENT DOCUMENTS

| | | | | |
|---|---|---|---|---|
| 8,355,212 B2 * | 1/2013 | Matsumoto | ............ | G02B 7/102 359/699 |
| 11,609,484 B2 * | 3/2023 | Abe | ............ | H04N 23/51 |
| 2010/0085474 A1 * | 4/2010 | Morita | ............ | H04N 23/50 348/374 |

* cited by examiner

Primary Examiner — Clayton E. LaBalle
Assistant Examiner — Warren K Fenwick
(74) Attorney, Agent, or Firm — JCIPRNET

(57) ABSTRACT

A lens unit includes a guided portion that includes a first bearing portion and a second bearing portion disposed to be spaced apart from each other in a direction X and is slidably supported by a guide shaft, and a lens holding member. The lens unit includes a first tilt-preventing member having a linear expansion coefficient lower than a linear expansion coefficient of the lens holding member. The first tilt-preventing member is fixed to a region of the guided portion positioned between the first bearing portion and second bearing portion.

9 Claims, 9 Drawing Sheets

LENS UNIT AND IMAGING DEVICE

CROSS REFERENCE TO RELATED APPLICATION

This application is a continuation application of and claims the priority benefit of a prior application Ser. No. 17/206,133, filed on Mar. 19, 2021. The prior application Ser. No. 17/206,133 is a continuation of International Application No. PCT/JP2019/035071 filed on Sep. 5, 2019, and claims priority from Japanese Patent Application No. 2018-182326 filed on Sep. 27, 2018, the entire disclosures of which are incorporated herein by reference.

BACKGROUND OF THE INVENTION

1. Field of the Invention

The present invention relates to a lens unit and an imaging device.

2. Description of the Related Art

As an optical device, such as an imaging device, such as a digital camera, an interchangeable lens for a lens-interchangeable camera, binoculars, or a telescope, there is an optical device that includes a holding member for holding a lens and a guide member for guiding the movement of the holding member.

JP2010-204501A discloses a video camera that comprises a lens holding frame holding a lens unit and movable in the direction of an optical axis and a guide bar guiding the movement of the lens holding frame.

JP1999-271586A(JP-H11-271586A) discloses a support structure for a lens that supports a lens on a lens frame through a support member disposed in at least one direction of a thrust direction or a radial direction of the lens and prevents the deterioration of optical performance caused by temperature environment by being formed using unique linear expansion coefficients depending on the materials of the lens, the support member, and the lens frame so that the dimensions of these members and the linear expansion coefficients satisfy a certain equation.

JP2014-219503A discloses configuration where a ring made of metal having a thermal expansion coefficient lower than the thermal expansion coefficient of a lens holding barrel is provided on the outer periphery of the lens holding barrel to prevent the inclination of a lens.

SUMMARY OF THE INVENTION

In the configuration where a part of the lens holding frame holding a lens is provided with a tube part into which a guide bar is inserted, and this tube part is caused to slide on the guide bar to move the lens holding frame as disclosed in JP2010-204501A, the tube part needs to be provided with two bearing portions sliding on the guide bar.

A clearance, which is small to allow the lens holding frame to slide, is provided between each of the two bearing portions and the guide bar. A distance between the two bearing portions needs to be increased to suppress the tilt of the lens holding frame with respect to the direction of the optical axis that is caused by the clearances. However, other optical elements and the like are arranged around the optical device in addition to the movable lens. For this reason, in order to avoid the interference with other structures provided around the lens holding frame while increasing a distance between the two bearing portions, at present, there is no choice but to employ the shape of the tube part in which distances between a portion (lens fixing portion) of the lens holding frame to which the lens is fixed and the respective two bearing portions are not uniform as illustrated in JP2010-204501A.

In a case where the distances between the lens fixing portion and the respective two bearing portions are different from each other as described above, differences occur in the amount of thermal expansion and the amount of thermal contraction of the tube part at the position of each bearing portion. In a case where differences are present in the amount of thermal expansion and the amount of thermal contraction, there is a possibility that the tube part of the lens holding frame may tilt with respect to the direction of the optical axis. As a result, the tilt of the lens occurs.

The tilt of the lens caused by a difference in the distances between the lens fixing portion and the respective two bearing portions is not considered in JP2010-204501A. In JP1999-271586A (JP-H11-271586A) and JP2014-219503A, configuration in which a lens holding member is moved by a guide member is not disclosed and the above-mentioned problem is not recognized.

The invention has been made in consideration of the above-mentioned circumstances, and an object of the invention is to provide a lens unit that can prevent the tilt of the optical axis of a movable lens and an imaging device that comprises the lens unit.

A lens unit according to an aspect of the invention comprises a lens, a lens holding member that holds the lens, and a guide shaft that guides movement of the lens holding member in a direction of an optical axis of the lens. The lens holding member includes a guided portion that includes a first bearing portion and a second bearing portion disposed to be spaced apart from each other in the direction of the optical axis and is slidably supported by the guide shaft. The lens unit includes a first tilt-preventing member that is fixed to a region of the guided portion positioned between the first and second bearing portions and has a linear expansion coefficient lower than a linear expansion coefficient of the lens holding member.

An imaging device according to another aspect of the invention comprises the lens unit and an imaging element that images a subject through the lens.

According to the invention, it is possible to provide a lens unit that can prevent the tilt of an optical axis of a movable lens and an imaging device that includes the lens unit.

DESCRIPTION OF THE PREFERRED EMBODIMENTS

An embodiment of the invention will be described below with reference to the drawings.

Figure 1:
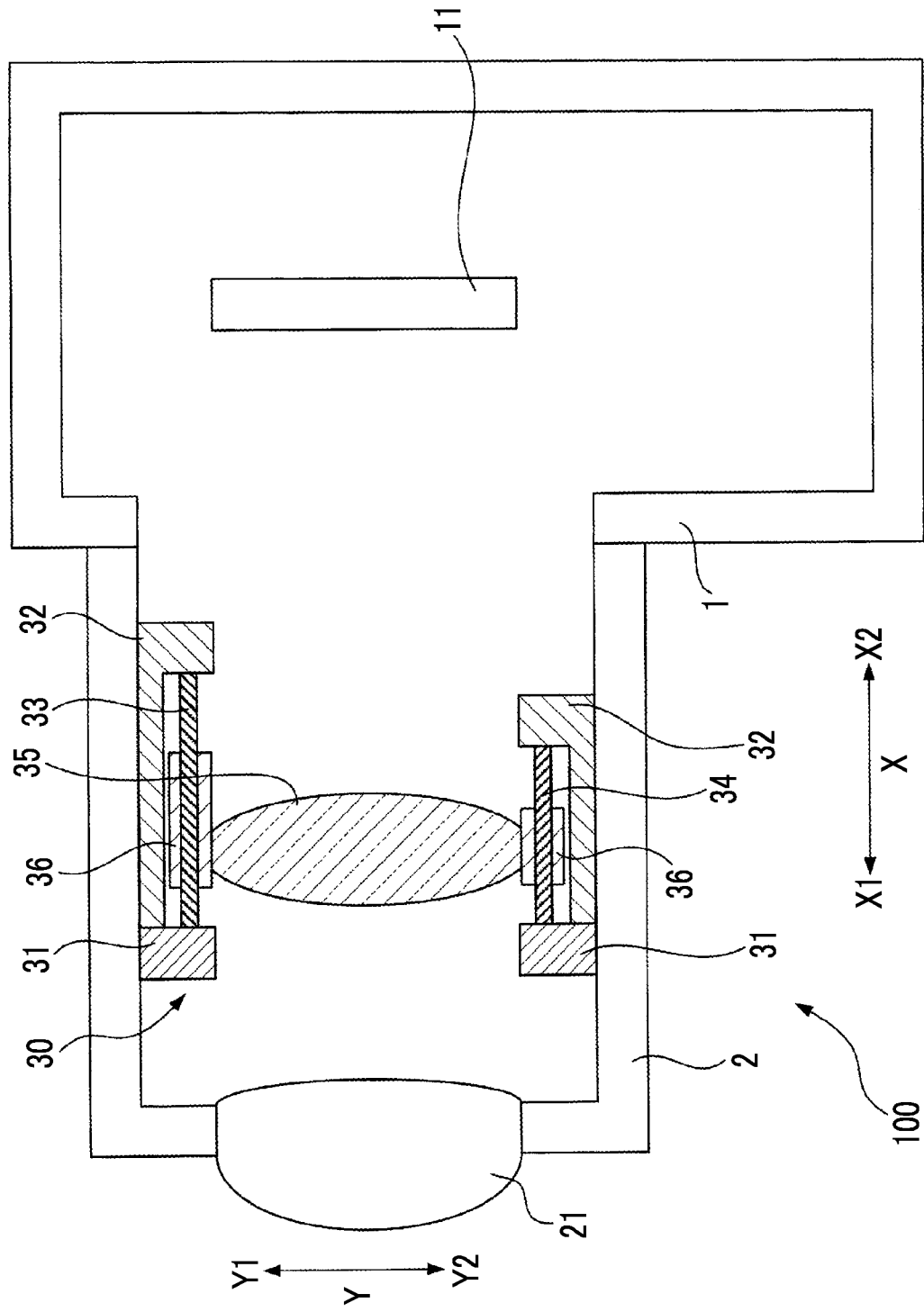
FIG. 1 is a schematic diagram showing the schematic configuration of a digital camera 100 that is an imaging device according to an embodiment of the invention.

FIG. 1 is a schematic diagram showing the schematic configuration of a digital camera 100 that is an imaging device according to an embodiment of the invention. The digital camera 100 comprises a main body part 1 and a lens barrel 2 that is adapted to be attachable to and detachable from the main body part 1. The lens barrel 2 may be fixed to and integrated with the main body part 1.

An optical system including a plurality of lenses is built in the lens barrel 2, and the lens barrel 2 comprises an imaging lens 21 that is disposed closest to a subject and a lens unit 30 that is provided between the imaging lens 21 and an imaging element 11.

The main body part 1 includes the imaging element 11, such as a charge coupled device (CCD) image sensor or a metal-oxide-semiconductor (MOS) image sensor, which images a subject through the optical system included in the lens barrel 2.

In the following description, the direction of the optical axis of the optical system included in the lens barrel 2 is referred to as a direction X, a direction toward a subject from the imaging element 11 in the direction X is referred to as a direction X1, and a direction opposite to the direction X1 is referred to as a direction X2. Further, a direction perpendicular to the direction X is referred to as a direction Y, a direction from one side toward the other side in the direction Y is referred to as a direction Y1, and a direction opposite to the direction Y1 is referred to as a direction Y2.

The lens unit 30 comprises a lens 35, a tubular lens holding member 36 that holds the lens 35 in a hollow portion, a shaft holding member 31 and a shaft holding member 32 that are supported on the inner peripheral surface of the lens barrel 2, a guide shaft 33 that guides the movement of the lens holding member 36 in the direction X, a rotation-preventing shaft 34, and a drive mechanism (not shown) (for example, a voice coil motor, other motors, or the like) that moves the lens holding member 36 in the direction X.

The lens 35 is a focus lens that is moved in the direction X to change a focus position, a zoom lens that is moved in the direction X to change a focal length, or the like. The lens 35 is generally made of glass or the like.

Each of the guide shaft 33 and the rotation-preventing shaft 34 is a member that extends in the direction X and has a tubular shape, a columnar shape, or the like, an end portion thereof corresponding to the direction X1 is held by the shaft holding member 31, and an end portion thereof corresponding to the direction X2 is held by the shaft holding member 32. Each of the guide shaft 33 and the rotation-preventing shaft 34 is made of, for example, metal or the like.

The lens holding member 36 includes an opening to be described later into which the guide shaft 33 is to be inserted, and is adapted to be movable along the guide shaft 33 in the direction X by the sliding operation between the opening and the guide shaft 33. Further, the lens holding member 36 includes a notch to be described later that is engaged with the rotation-preventing shaft 34. The rotation of the lens holding member 36 about the optical axis of the lens 35 is prevented by the rotation-preventing shaft 34. The lens holding member 36 is made of, for example, plastic, a resin, metal, or the like.

Figure 2:
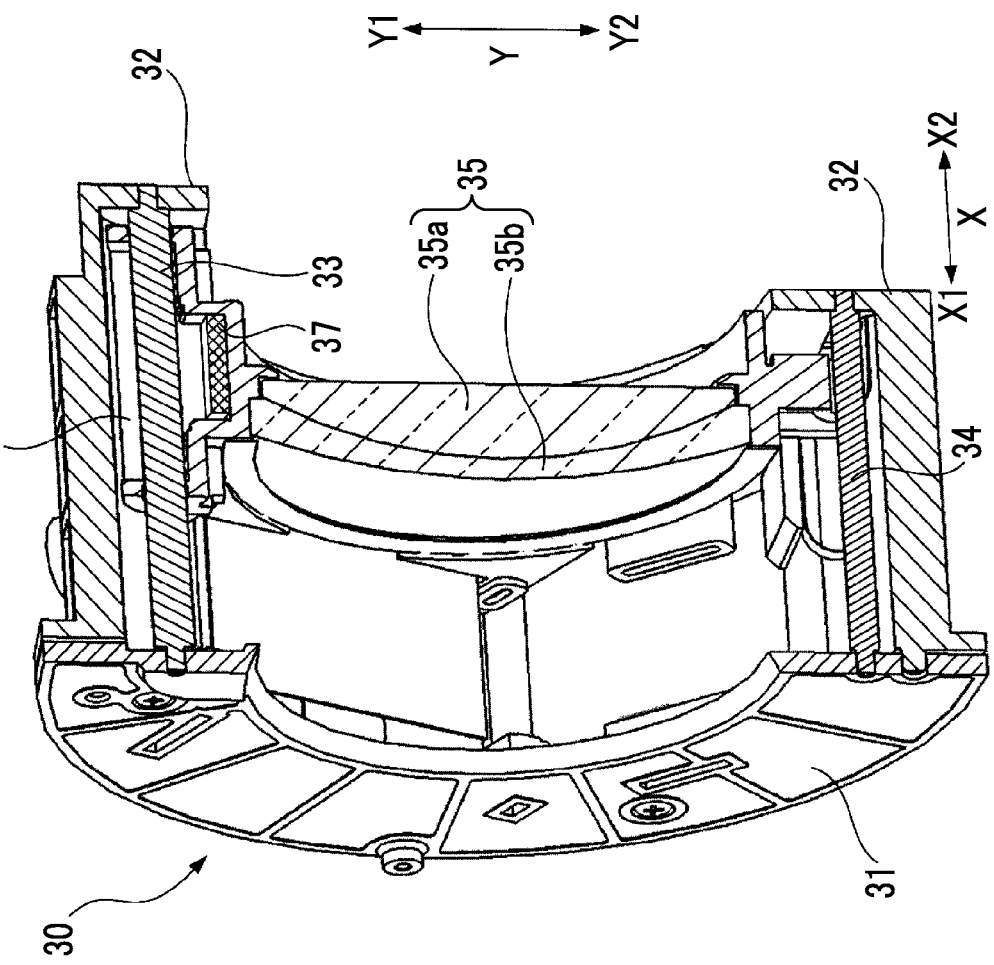
FIG. 2 is a diagram showing an example of the detailed configuration of a lens unit 30 of the digital camera 100 shown in FIG. 1.
Figure 3:
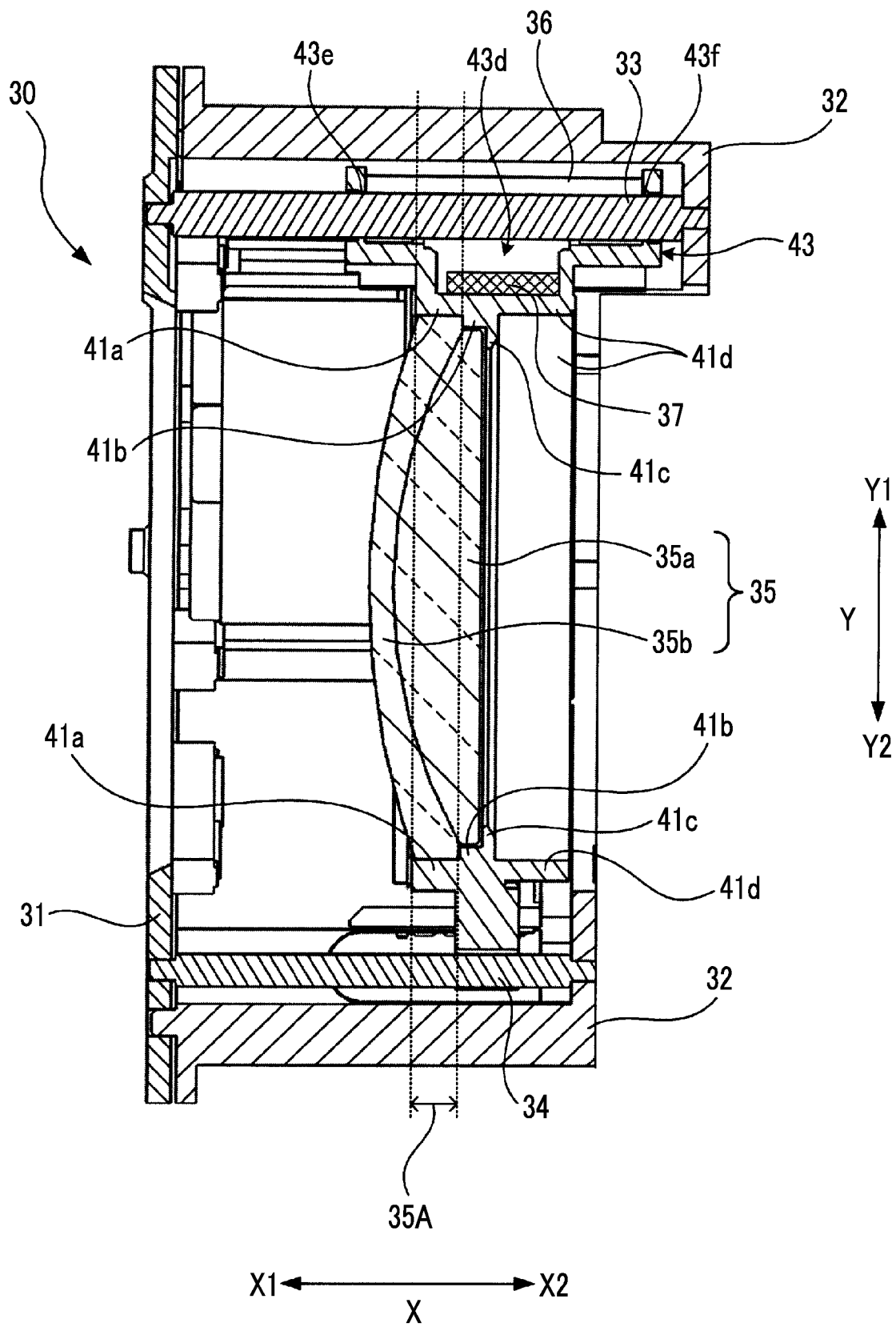
FIG. 3 is a diagram showing the cross section of the lens unit 30 shown in FIG. 2 that is viewed in a direction perpendicular to a direction X and a direction Y.
Figure 4:
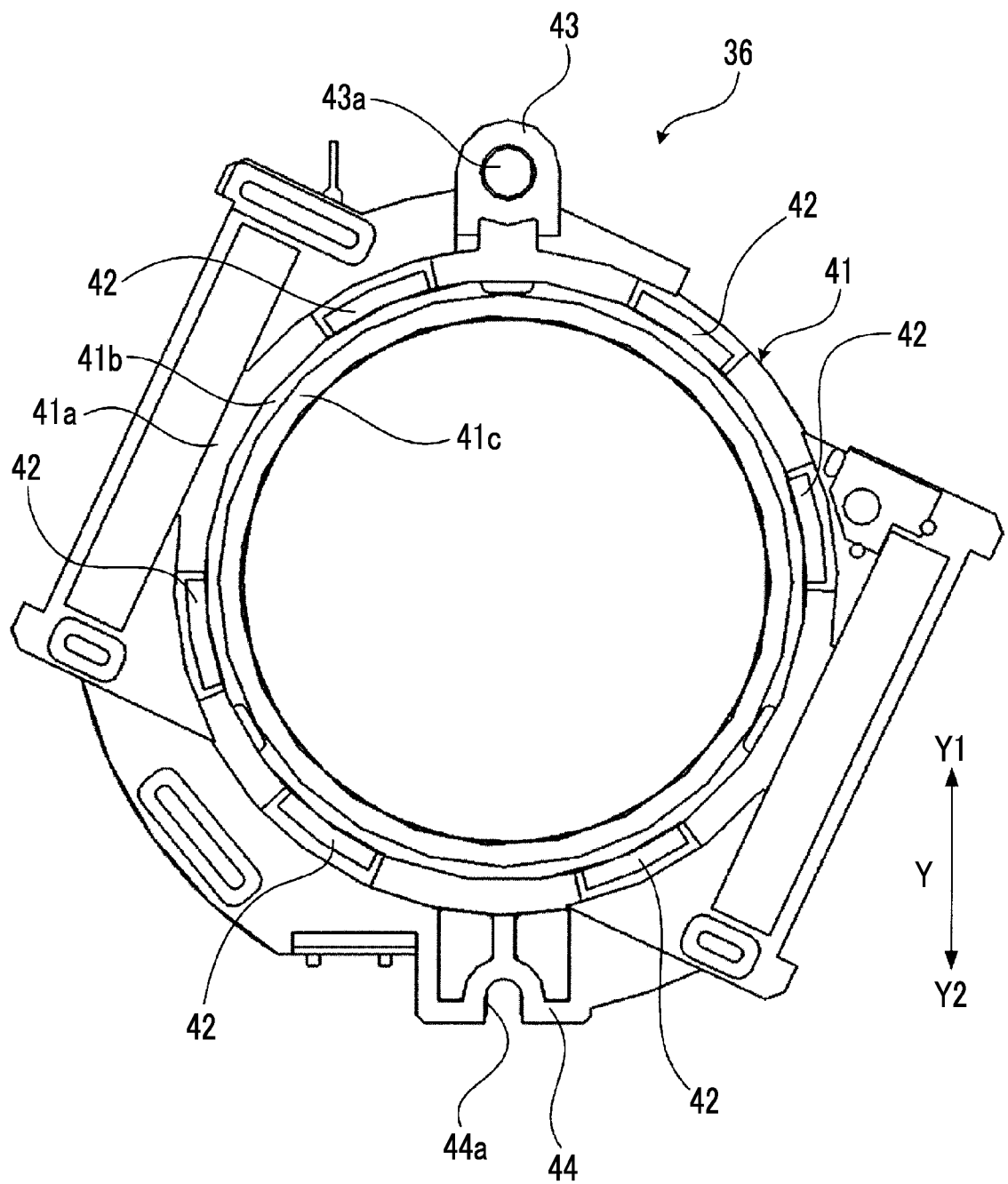
FIG. 4 is a diagram showing a lens holding member 36 of the lens unit 30 shown in FIG. 1 that is viewed in a direction X2.
Figure 5:
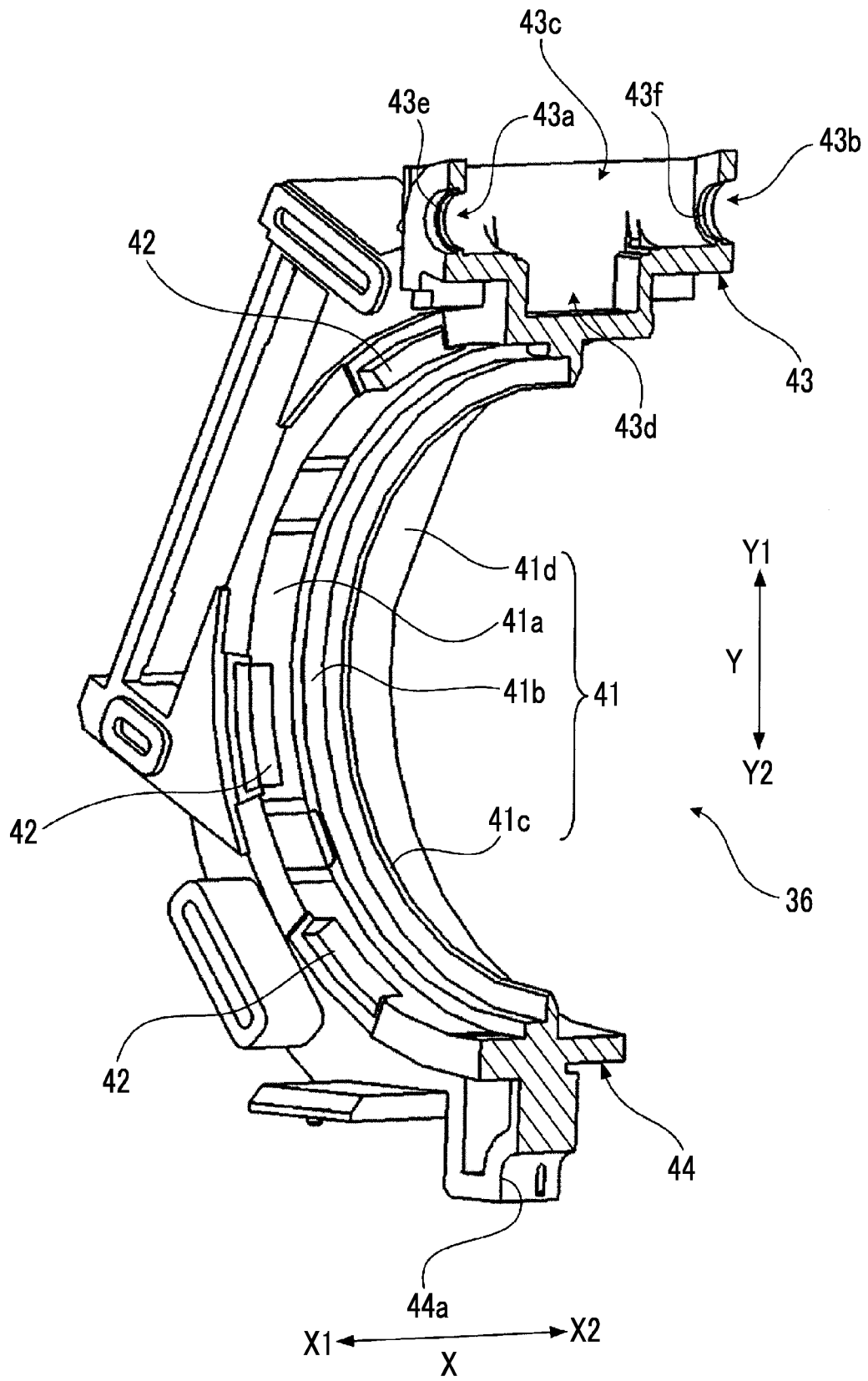
FIG. 5 is a perspective view showing the cross section of the lens holding member 36 shown in FIG. 4 taken along a plane that passes through the optical axis of a lens 35 and is parallel to the direction X and the direction Y.
Figure 6:
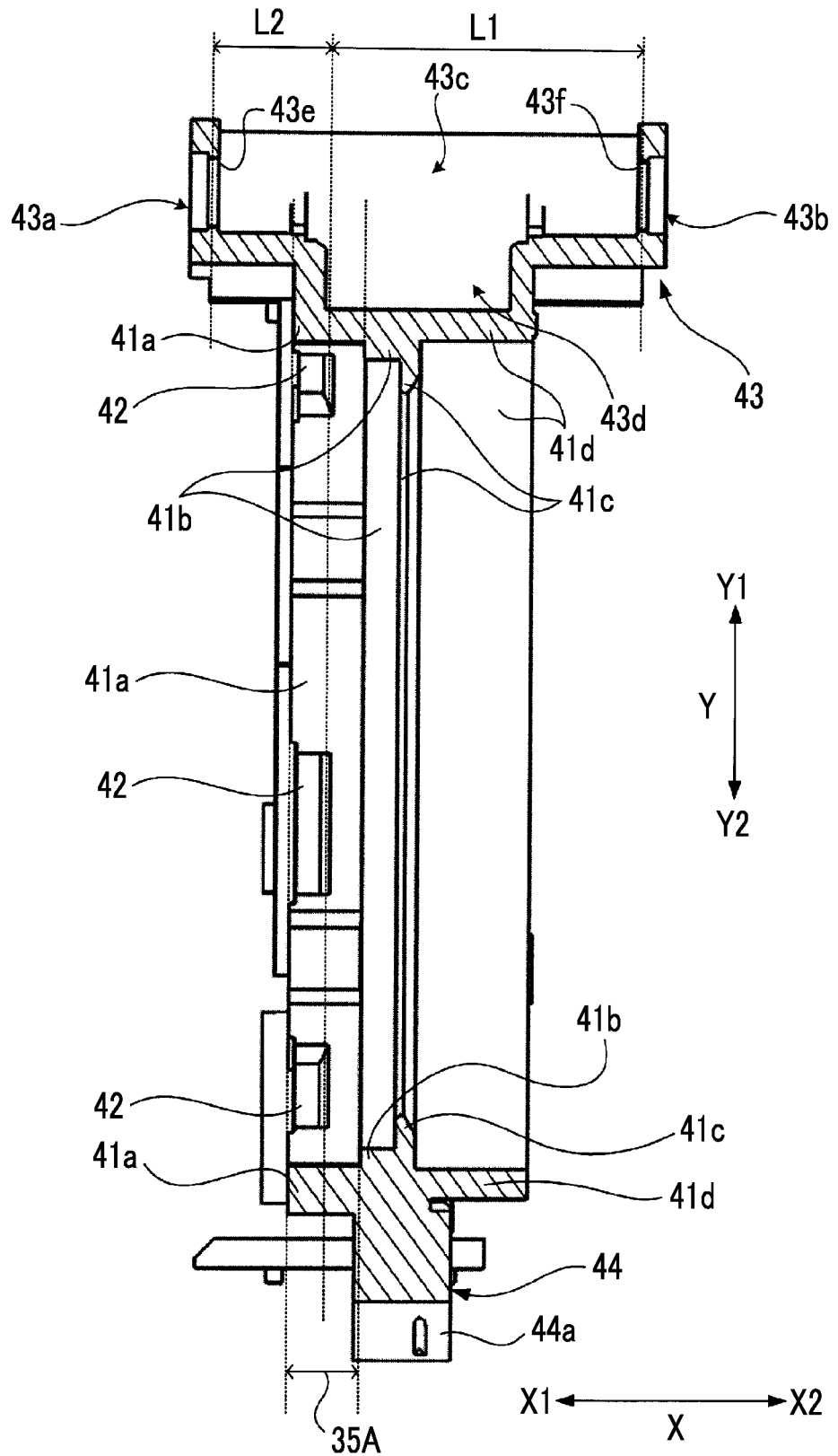
FIG. 6 is a diagram showing the cross section of the lens holding member 36 shown in FIG. 5 that is viewed in the direction perpendicular to the direction X and the direction Y.

FIG. 2 is a diagram showing an example of the detailed configuration of the lens unit 30 of the digital camera 100 shown in FIG. 1. FIG. 2 is a perspective view schematically showing the cross section of the lens unit 30 taken along a plane that passes through the optical axis of the lens 35 and is parallel to the direction X and the direction Y. FIG. 2 shows an example of configuration in a case where a voice coil motor is used as a drive mechanism for the lens holding member 36. FIG. 3 is a diagram showing the cross section of the lens unit 30 shown in FIG. 2 that is viewed in a direction perpendicular to the direction X and the direction Y. FIG. 4 is a diagram showing the lens holding member 36 of the lens unit 30 shown in FIG. 1 that is viewed in the direction X2. FIG. 5 is a perspective view showing the cross section of the lens holding member 36 shown in FIG. 4 taken along a plane that passes through the optical axis of the lens 35 and is parallel to the direction X and the direction Y. FIG. 6 is a diagram showing the cross section of the lens holding member 36 shown in FIG. 5 that is viewed in the direction perpendicular to the direction X and the direction Y.

As shown in FIG. 2, the shaft holding member 31 is a substantially cylindrical member of which the axial direction is parallel to the direction X. Further, the shaft holding member 32 is disposed closer to the imaging element 11 than the shaft holding member 31, and is a substantially cylindrical member of which the axial direction is parallel to the direction X.

As shown in FIGS. 2 and 3, the guide shaft 33 is disposed closer to a side corresponding to the direction Y1 than the optical axis of the lens 35. The rotation-preventing shaft 34 is disposed closer to a side corresponding to the direction Y2 than the optical axis of the lens 35. That is, the guide shaft 33 and the rotation-preventing shaft 34 are disposed side by side in the direction Y with the lens 35 interposed therebetween.

In the example shown in FIGS. 2 and 3, the guide shaft 33 is formed of a columnar member extending in the direction X. The end portion of the guide shaft 33 corresponding to the direction X2 is fitted to a hole portion formed in the end portion of the shaft holding member 32 corresponding to the direction X2, and the end portion of the guide shaft 33 corresponding to the direction X1 is fitted to a recessed portion formed in the shaft holding member 31.

In the example shown in FIGS. 2 and 3, the rotation-preventing shaft 34 is formed of a columnar member extending in the direction X. The length of the rotation-preventing shaft 34 in the direction X is shorter than that of the guide shaft 33. The end portion of the rotation-preventing shaft 34 corresponding to the direction X2 is fitted to a hole portion formed in the end portion of the shaft holding member 32 corresponding to the direction X2, and the end portion of the rotation-preventing shaft 34 corresponding to the direction X1 is fitted to a recessed portion formed in the shaft holding member 31.

As shown in FIGS. 4 to 6, the lens holding member 36 holds the lens 35 and comprises a tubular main body part 41 that forms the optical path of light passing through the lens 35.

The main body part 41 comprises a substantially annular large-diameter portion 41a of which the inner diameter is largest, a substantially annular medium-diameter portion 41b of which the inner diameter is smaller than the inner diameter of the large-diameter portion 41a, a substantially annular small-diameter portion 41c of which the inner diameter is smaller than the inner diameter of the medium-diameter portion 41b, and a large-diameter portion 41d of which the inner diameter is substantially equal to the inner diameter of the large-diameter portion 41a. The large-diameter portion 41a, the medium-diameter portion 41b, the small-diameter portion 41c, and the large-diameter portion 41d are continuously arranged in this order to the direction X2 from the direction X1.

As shown in FIGS. 4 to 6, a plurality of (six in the example shown in FIG. 4) recessed portions 42 extending over the inner peripheral surface of the large-diameter portion 41a and an end face of the large-diameter portion 41a corresponding to the direction X1 are formed on these two surfaces. The six recessed portions 42 are formed side by side in the circumferential direction of the large-diameter portion 41a.

As shown in FIGS. 2 and 3, the lens 35 is formed of a cemented lens of which a first lens 35a and a second lens 35b are cemented to each other. The second lens 35b is disposed closer to a subject than the first lens 35a.

The second lens 35b is fitted to the inner peripheral surface of the large-diameter portion 41a, so that the lens 35 is fixed to the lens holding member 36. Further, the recessed portions 42 formed on the large-diameter portion 41a of the lens holding member 36 are filled with an adhesive, such as a resin, and the second lens 35b and the lens holding member 36 are further fixed to each other by the adhesive filled in the recessed portions 42.

A portion of the inner peripheral surface of the large-diameter portion 41a to which the lens 35 is fitted and the recessed portions 42 which are filled with an adhesive form a fixing portion 35A (see FIGS. 3 and 6) that is a portion of the lens holding member 36 fixed to the lens 35. In other words, a portion of the large-diameter portion 41a between an end portion of the inner peripheral surface of the large-diameter portion 41a corresponding to the direction X2 and an end face of the large-diameter portion 41a corresponding to the direction X1 forms the fixing portion 35A.

As shown in FIG. 4, the lens holding member 36 further comprises a guided portion 43 that is formed integrally with the main body part 41 and a rotation-preventing portion 44 that is formed integrally with the main body part 41. In the example shown in FIG. 4, the guided portion 43 and the rotation-preventing portion 44 are disposed side by side in the direction Y with the optical axis of the lens 35 interposed therebetween.

A notch 44a to be engaged with the rotation-preventing shaft 34 is formed at the rotation-preventing portion 44. In a case where the lens holding member 36 is moved in the direction X, the movement of the lens holding member 36 in the direction perpendicular to the direction X and the direction Y is prevented through the engagement between the notch 44a and the rotation-preventing shaft 34.

As shown in FIGS. 4 to 6, the guided portion 43 is formed in the shape of a tube including a hollow portion that leads to a stepped columnar opening 43b formed at an end portion thereof corresponding to the direction X2 from a stepped columnar opening 43a formed at an end portion thereof corresponding to the direction X1.

An opening 43c reaching the hollow portion is formed at an end portion of the guided portion 43 corresponding to the direction Y1. A recessed portion 43d is formed on the inner peripheral surface of an end portion of the guided portion 43 corresponding to the direction Y2.

The guide shaft 33 shown in FIGS. 1 to 3 is inserted into the openings 43a and 43b. A first bearing portion 43f of which the inner diameter is partially reduced is provided on the inner peripheral surface of the opening 43b. A second bearing portion 43e of which the inner diameter is partially reduced is provided on the inner peripheral surface of the opening 43a.

Each of an interval in the direction Y between the first bearing portion 43f and the guide shaft 33 in a state where the center of the first bearing portion 43f in the direction Y and the center of the guide shaft 33 in the direction Y coincide with each other and an interval in the direction Y between the second bearing portion 43e and the guide shaft 33 in a state where the center of the second bearing portion 43e in the direction Y and the center of the guide shaft 33 in the direction Y coincide with each other is set to, for example, 10 μm or less. Since these intervals are sufficiently small as described above, the guided portion 43 is adapted to be slidably supported by the guide shaft 33 through the first and second bearing portions 43f and 43e that are disposed to be spaced apart from each other in the direction X.

As shown in FIG. 6, a first distance L1 between the center of the fixing portion 35A of the lens holding member 36, which is fixed to the lens 35, in the direction X and the center of the first bearing portion 43f in the direction X is set to be longer than a second distance L2 between the center of the fixing portion 35A in the direction X and the center of the second bearing portion 43e in the direction X.

As shown in FIGS. 2 and 3, the lens unit 30 further comprises a first tilt-preventing member 37 that is fixed to the inner peripheral surface of the guided portion 43.

The first tilt-preventing member 37 is a member having a linear expansion coefficient lower than the linear expansion coefficient of the lens holding member 36, and is made of, for example, ceramic, metal, or the like.

The first tilt-preventing member 37 is fixed to a region, which is closer to the first bearing portion 43f than the center of the fixing portion 35A in the direction X, of a portion of the guided portion 43 positioned between the first and second bearing portions 43f and 43e by adhesion, screwing, or the like.

Specifically, as shown in FIG. 3, the first tilt-preventing member 37 is fixed to the bottom of the recessed portion 43d of the guided portion 43 and is provided at a position where a part of the first tilt-preventing member 37 overlaps with the fixing portion 35A in a state where the first tilt-preventing member 37 is viewed in the direction Y In the example shown in FIGS. 2 and 3, the first tilt-preventing member 37 is formed of a member that extends in the direction X and has the shape of a bar, such as a prism.

The first tilt-preventing member 37 may be fixed to, for example, the inner peripheral surface of the guided portion 43 between the recessed portion 43d and the bearing portion 43f In this case, the shape of the first tilt-preventing member 37 may also be, for example, an annular shape or a semi-annular shape as viewed in the direction X.

According to the digital camera 100 having the above-mentioned configuration, the first tilt-preventing member 37 having a linear expansion coefficient lower than the linear expansion coefficient of the lens holding member 36 is fixed to a region, which is closer to the first bearing portion 43f than the center of the fixing portion 35A, of the guided portion 43 of the lens unit 30. For this reason, differences between the amount of thermal contraction and the amount of thermal expansion of the guided portion 43 near the first bearing portion 43f and the amount of thermal contraction and the amount of thermal expansion of the guided portion 43 near the second bearing portion 43e, which are caused by a difference between the first distance L1 between the center of the first bearing portion 43f and the center of the fixing portion 35A and the second distance L2 between the center of the second bearing portion 43e and the center of the fixing portion 35A, can be reduced by the first tilt-preventing member 37. Since differences in the amount of thermal contraction and the amount of thermal expansion are reduced, it is possible to prevent a line, which connects the center of the first bearing portion 43f to the center of the second bearing portion 43e, from being inclined with respect to the direction X even in a case where the lens unit 30 is subjected to a large temperature change. As a result, since the inclination of the optical axis of the lens 35 is prevented, the image quality of the digital camera 100 can be improved.

Further, the first tilt-preventing member 37 is fixed to the inner peripheral surface of the guided portion 43 in the lens unit 30 of the digital camera 100. According to this configuration, even in a case where metal of which the reflection of light or the like is high is used for the first tilt-preventing member 37, it is possible to prevent light, which passes through the optical system provided in the lens barrel 2, from being incident on the first tilt-preventing member 37. Since the reflection of light by the first tilt-preventing member 37 is prevented as described above, the occurrence of ghost during imaging can be prevented.

In order to reduce the differences in the amount of thermal contraction and the amount of thermal expansion having been described above, it is preferable that a design is made to satisfy the relationship of Equation (I) in a case where the linear expansion coefficient of the lens holding member 36 is denoted by T, the linear expansion coefficient of the first tilt-preventing member 37 is denoted by Ta, and the length of the first tilt-preventing member 37 in the direction X is denoted by La.

$$La=(T \times L1 - T \times L2)/(T - Ta) \ldots \quad (I)$$

In a case where the selection of a material or the like is performed so that the relationship of Equation (I) is satisfied, it is possible to make the differences in the amount of thermal contraction and the amount of thermal expansion closer to zero. Accordingly, the inclination of the optical axis can be prevented with higher accuracy.

Even in a case where the first tilt-preventing member 37 has configuration where the first tilt-preventing member 37 does not include a region overlapping with the fixing portion 35A as viewed in the direction Y (configuration where the end portion of the first tilt-preventing member 37 corresponding to the direction X1 is positioned closer to a side corresponding to the direction X2 than the fixing portion 35A in FIG. 3), the above-mentioned effect can be obtained.

Figure 7:
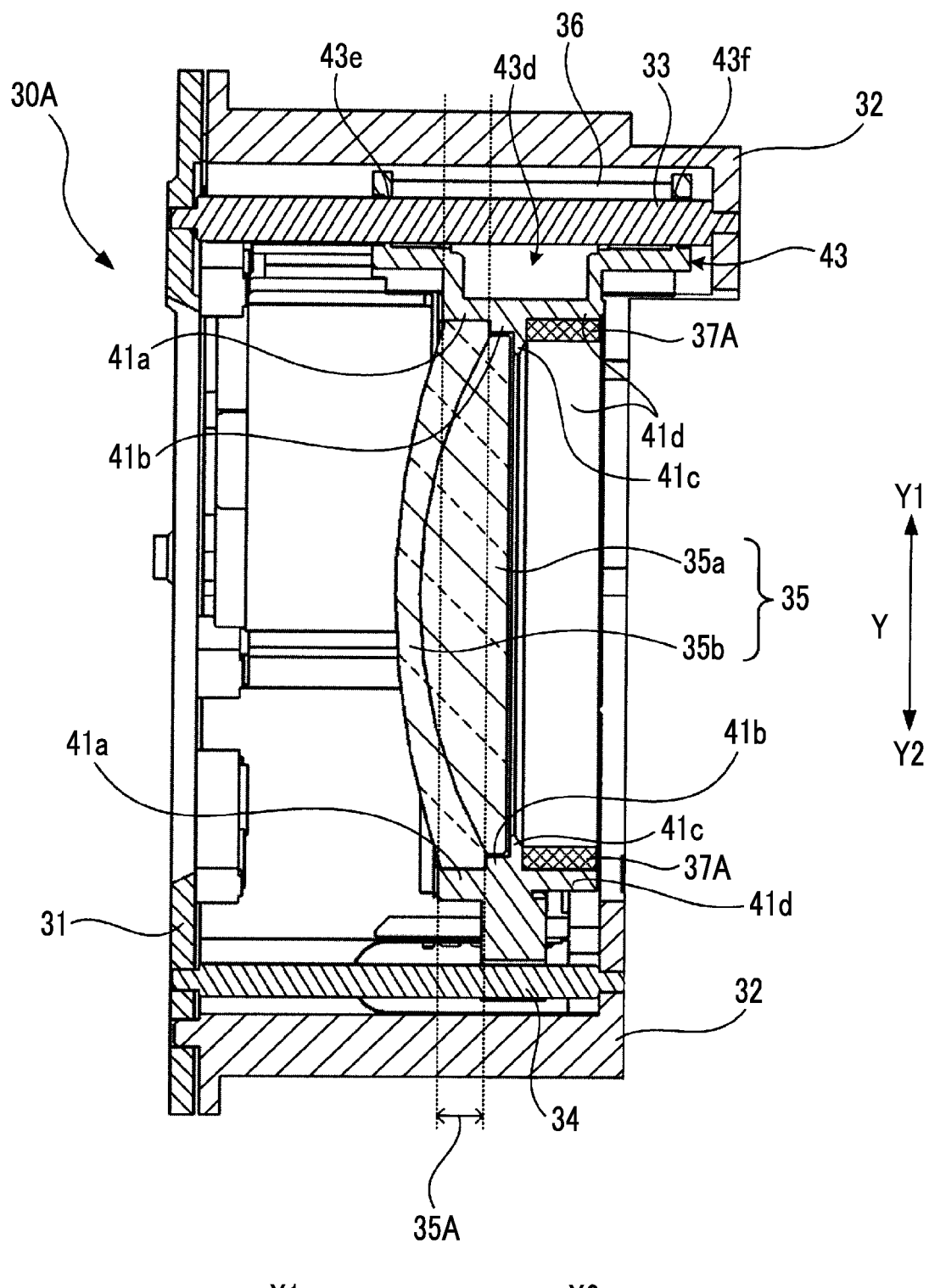
FIG. 7 is a schematic cross-sectional view of a lens unit 30A that is a modification example of the lens unit 30 shown in FIG. 1.

FIG. 7 is a schematic cross-sectional view of a lens unit 30A that is a modification example of the lens unit 30 shown in FIG. 1. The lens unit 30A has the same configuration as the lens unit 30 except that the first tilt-preventing member 37 is changed to a first tilt-preventing member 37A. The same components as those shown in FIG. 3 are denoted in FIG. 7 by the same reference numerals as those of FIG. 3 and the description thereof will be omitted.

The first tilt-preventing member 37A is a member having a linear expansion coefficient lower than the linear expansion coefficient of the lens holding member 36, and is made of, for example, ceramic, metal, or the like. The first tilt-preventing member 37A is fixed to the outer peripheral surface of a region, which is closer to the first bearing portion 43f than the center of the fixing portion 35A in the direction X, of a portion of the guided portion 43 positioned between the first and second bearing portions 43f and 43e by adhesion, fitting, screwing, or the like. More specifically, the first tilt-preventing member 37A is formed of a substantially annular member that is fixed to the inner peripheral surface of the large-diameter portion 41d. The shape of the first tilt-preventing member 37A is not limited to an annular shape, and may be the shape of a semicircular ring that is fixed to the inner peripheral surface of the large-diameter portion 41d, the shape of a circular ring of which the width is partially shortened, the shape of a bar that is fixed to the inner peripheral surface of the large-diameter portion 41d and extends in the direction X, or the like.

In a case where the lens unit 30A is also designed so as to satisfy an equation where "La" is substituted with the length of the first tilt-preventing member 37A in the direction X and "Ta" is substituted with the linear expansion coefficient of the first tilt-preventing member 37A in Equation (I), it is possible to make the differences in the amount of thermal contraction and the amount of thermal expansion close to zero. Accordingly, the inclination of the optical axis can be prevented with high accuracy.

Figure 8:
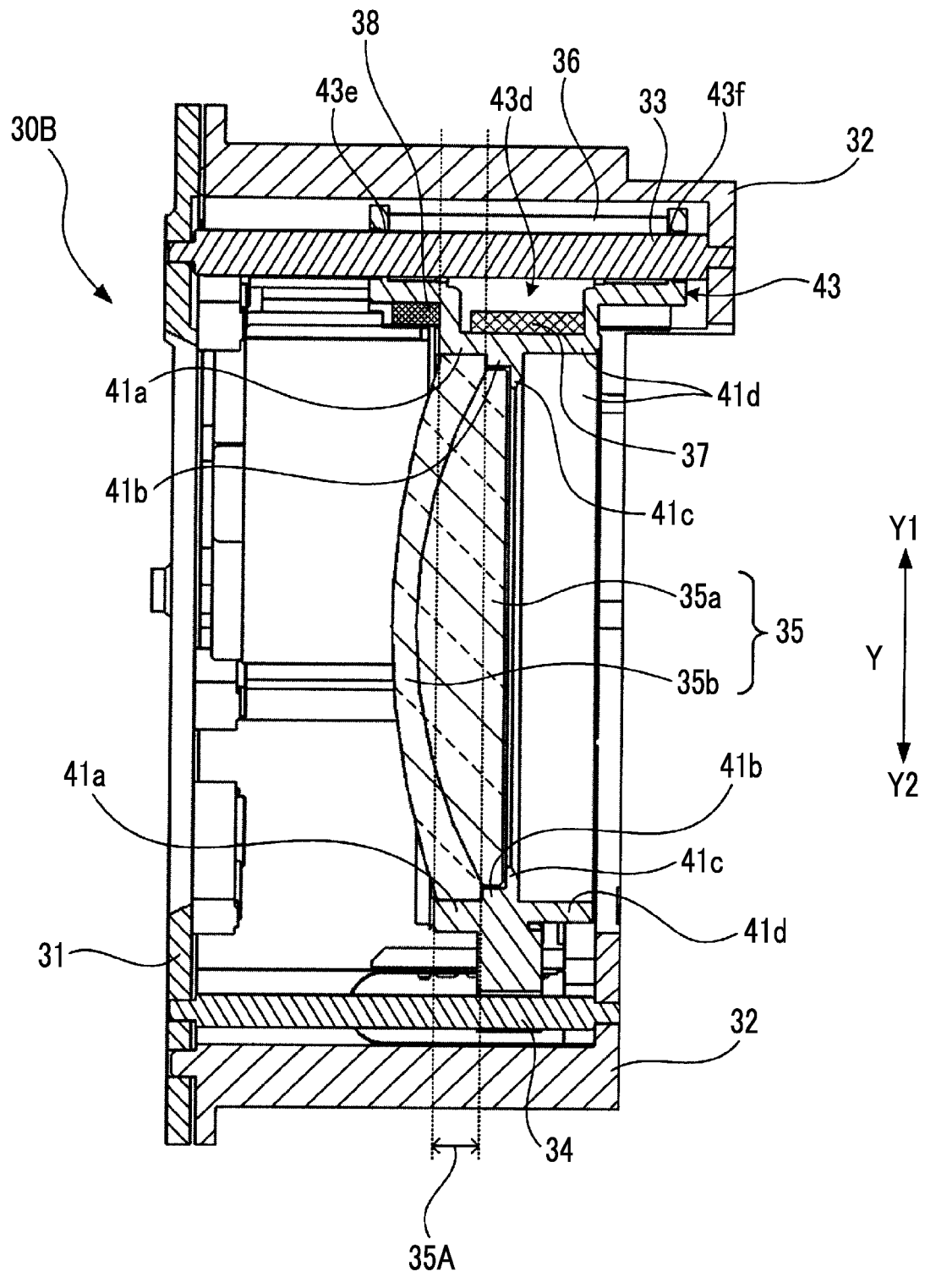
FIG. 8 is a schematic cross-sectional view of a lens unit 30B that is a modification example of the lens unit 30 shown in FIG. 1.

FIG. 8 is a schematic cross-sectional view of a lens unit 30B that is a modification example of the lens unit 30 shown in FIG. 1. The lens unit 30B has the same configuration as the lens unit 30 except that a second tilt-preventing member 38 is added. The same components as those shown in FIG. 3 are denoted in FIG. 8 by the same reference numerals as those of FIG. 3 and the description thereof will be omitted.

The second tilt-preventing member 38 is a member having a linear expansion coefficient higher than the linear expansion coefficient of the lens holding member 36, and is made of, for example, a resin or the like. The second tilt-preventing member 38 is fixed to the outer peripheral surface of a region, which is closer to the second bearing portion 43e than the center of the fixing portion 35A in the direction X, of a portion of the guided portion 43 positioned between the first and second bearing portions 43f and 43e by adhesion, fitting, screwing, or the like.

Specifically, the second tilt-preventing member 38 is fixed to the outer peripheral surface of a region of the guided portion 43 that is closer to the second bearing portion 43e than the large-diameter portion 41a. The shape of the second tilt-preventing member 38 is the shape of a bar that is fixed to the outer peripheral surface and extends in the direction X, but is not limited thereto and may be an annular shape, a semi-annular shape, the shape of a circular ring of which the width is partially shortened, or the like.

In the lens unit 30B shown in FIG. 8, a first tilt-preventing member 37 having a linear expansion coefficient lower than the linear expansion coefficient of the guided portion 43 is fixed to a region of the guided portion 43 between the center of the fixing portion 35A and the first bearing portion 43f and a second tilt-preventing member 38 having a linear expansion coefficient higher than the linear expansion coefficient of the guided portion 43 is fixed to a region of the guided portion 43 between the center of the fixing portion 35A and the second bearing portion 43e. According to this configuration, the differences in the amount of thermal contraction and the amount of thermal expansion can be reduced.

Further, according to this configuration, two members for adjusting the differences, that is, the first tilt-preventing member 37 and the second tilt-preventing member 38 are present. Accordingly, the degree of freedom in design can be improved.

It is preferable that the lens unit 30B is designed so as to satisfy the relationship of Equation (II) in a case where the linear expansion coefficient of the lens holding member 36 is denoted by T, the linear expansion coefficient of the first tilt-preventing member 37 is denoted by Ta, the length of the first tilt-preventing member 37 in the direction X is denoted by La, the linear expansion coefficient of the second tilt-preventing member 38 is denoted by Tb, and the length of the second tilt-preventing member 38 in the direction X is denoted by Lb.

$$La \times \{(Ta-T)-Lb\} \times (Tb-T) = T \times L2 - T \times L1 \ldots \quad (II)$$

In a case where the selection of a material or the like is performed so that the relationship of Equation (II) is satisfied, it is possible to make the differences in the amount of thermal contraction and the amount of thermal expansion closer to zero. Accordingly, the inclination of the optical axis can be prevented with higher accuracy.

Figure 9:
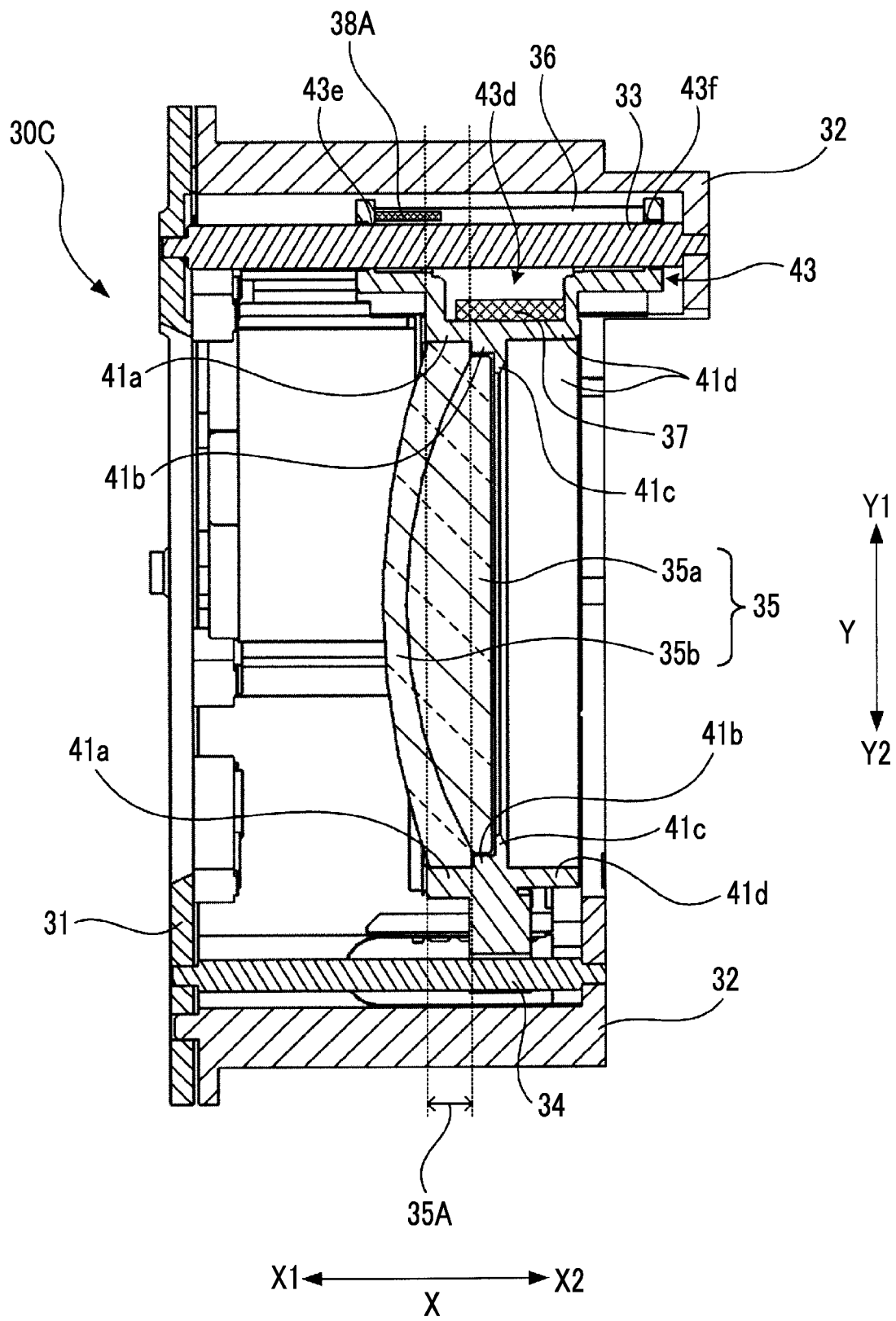
FIG. 9 is a schematic cross-sectional view of a lens unit 30C that is a modification example of the lens unit 30 shown in FIG. 1.

FIG. 9 is a schematic cross-sectional view of a lens unit 30C that is a modification example of the lens unit 30 shown in FIG. 1. The lens unit 30C has the same configuration as the lens unit 30B shown in FIG. 8 except that the second tilt-preventing member 38 is changed to a second tilt-preventing member 38A. The same components as those shown in FIG. 8 are denoted in FIG. 9 by the same reference numerals as those of FIG. 8 and the description thereof will be omitted.

The second tilt-preventing member 38A is a member having a linear expansion coefficient higher than the linear expansion coefficient of the lens holding member 36, and is made of, for example, a resin or the like. The second tilt-preventing member 38A is fixed to the inner peripheral surface of a region, which is closer to the second bearing portion 43e than the center of the fixing portion 35A in the direction X, of a portion of the guided portion 43 positioned between the first and second bearing portions 43f and 43e by adhesion, screwing, or the like. More specifically, the second tilt-preventing member 38A is fixed at a position that overlaps with the fixing portion 35A in a state where the second tilt-preventing member 38A is viewed in the direction Y.

In a case where the lens unit 30C is also designed so as to satisfy an equation where "Lb" is substituted with the length of the second tilt-preventing member 38A in the direction X and "Tb" is substituted with the linear expansion coefficient of the second tilt-preventing member 38A in Equation (II), it is possible to make the differences in the amount of thermal contraction and the amount of thermal expansion close to zero. Accordingly, the inclination of the optical axis can be prevented with high accuracy.

Further, according to the lens unit 30C, since the second tilt-preventing member 38A is fixed to the inner peripheral surface of the guided portion 43, the occurrence of ghost can be prevented even in a case where a material easily reflecting light is used for the second tilt-preventing member 38A.

Even in the configuration where the first tilt-preventing member 37 does not include a region overlapping with the fixing portion 35A in each of the lens units 30B and 30C as viewed in the direction Y, the above-mentioned effect can be obtained. Further, even in the configuration where the second tilt-preventing member 38A does not include a region overlapping with the fixing portion 35A in the lens unit 30C as viewed in the direction Y, the above-mentioned effect can be obtained.

The lens units 30, 30A, 30B, and 30C mounted on the digital camera 100 have been described above, but the configuration of the lens units 30, 30A, 30B, and 30C can also be applied to an imaging unit of a smartphone, binoculars, a telescope, or the like.

The followings are disclosed in this specification as described above.

(1) A lens unit comprising:
a lens;
a lens holding member that holds the lens; and
a guide shaft that guides movement of the lens holding member in a direction of an optical axis of the lens,
wherein the lens holding member includes a guided portion that includes a first bearing portion and a second bearing portion disposed to be spaced apart from each other in the direction of the optical axis and is slidably supported by the guide shaft,
a first distance in the direction of the optical axis between a center of a fixing portion of the lens holding member, which is fixed to the lens, in the direction of the optical axis and a center of the first bearing portion in the direction of the optical axis is set to be longer than a second distance in the direction of the optical axis between the center of the fixing portion of the lens holding member, which is fixed to the lens, in the direction of the optical axis and a center of the second bearing portion in the direction of the optical axis, and
the lens unit includes a first tilt-preventing member that is fixed to a region, which is closer to the first bearing portion than the center of the fixing portion, of a portion of the guided portion positioned between the first and second bearing portions and has a linear expansion coefficient lower than a linear expansion coefficient of the lens holding member.

(2) The lens unit according to (1),
wherein the first tilt-preventing member includes a region overlapping with the fixing portion in a state where the first tilt-preventing member is viewed in a direction perpendicular to the direction of the optical axis.

(3) The lens unit according to (1) or (2),
wherein the guided portion has a tubular shape, and
the first tilt-preventing member is fixed to an inner peripheral surface of the guided portion.

(4) The lens unit according to any one of (1) to (3),
wherein a relationship of "La=(T×L1−T×L2)/(T−Ta)" is satisfied in a case where the linear expansion coefficient of the lens holding member is denoted by T, the linear expansion coefficient of the first tilt-preventing member is denoted by Ta, a length of the first tilt-preventing member in the direction of the optical axis is denoted by La, the first distance is denoted by L1, and the second distance is denoted by L2.

(5) The lens unit according to any one of (1) to (3), further comprising:
a second tilt-preventing member that is fixed to a region, which is closer to the second bearing portion than the center of the fixing portion, of the portion of the guided portion and has a linear expansion coefficient higher than the linear expansion coefficient of the lens holding member.

(6) The lens unit according to (5),
wherein the second tilt-preventing member includes a region overlapping with the fixing portion in a state where the second tilt-preventing member is viewed in a direction perpendicular to the direction of the optical axis.

(7) The lens unit according to (5) or (6), wherein the guided portion has a tubular shape, and the second tilt-preventing member is fixed to an inner peripheral surface of the guided portion.

(8) The lens unit according to any one of (5) to (7), wherein a relationship of "La×{(Ta-T)-Lb}×(Tb-T)=T×L2-T×L1" is satisfied in a case where the linear expansion coefficient of the lens holding member is denoted by T, the linear expansion coefficient of the first tilt-preventing member is denoted by Ta, a length of the first tilt-preventing member in the direction of the optical axis is denoted by La, the linear expansion coefficient of the second tilt-preventing member is denoted by Tb, a length of the second tilt-preventing member in the direction of the optical axis is denoted by Lb, the first distance is denoted by L1, and the second distance is denoted by L2.

(9) The lens unit according to any one of (1) to (8), wherein the lens is fitted to the lens holding member at the fixing portion and is adhered to the lens holding member by an adhesive.

(10) An imaging device comprising:
the lens unit according to any one of (1) to (9); and
an imaging element that images a subject through the lens.

Various embodiments have been described above with reference to the drawings, but it goes without saying that the invention is not limited to the embodiments. Since it is apparent for those skilled in the art that various changes or modifications can be thought up within categories described in claims, it is naturally understood that these changes or modifications also pertain to the technical scope of the invention. Further, the respective components of the above-mentioned embodiments may be combined arbitrarily without departing from the scope of the invention.

This application is based on Japanese Patent Application (JP2018-182326) filed Sep. 27, 2018, the contents of which are incorporated herein by reference.

Since the invention is applied to a smartphone, a digital camera, or the like, the invention is highly convenient and effective.

Explanation of References

100: digital camera
1: main body part
11: imaging element
2: lens barrel
21: imaging lens
30: lens unit
31, 32: shaft holding member
33: guide shaft
34: rotation-preventing shaft
35: lens
35a: first lens
35b: second lens
35A: fixing portion
36: lens holding member
41: main body part
41a, 41d: large-diameter portion
41b: medium-diameter portion
41c: small-diameter portion
42: recessed portion
43: guided portion
43a, 43b, 43c: opening
43d: recessed portion
43f: first bearing portion
43e: second bearing portion
44: rotation-preventing portion
44a: notch
37, 37A: first tilt-preventing member
38, 38A: second tilt-preventing member

What is claimed is:

1. A lens unit comprising:
a lens;
a lens holding member that holds the lens; and
a guide shaft that guides movement of the lens holding member in a direction of an optical axis of the lens,
wherein the lens holding member includes a guided portion that is slidably supported by the guide shaft, the guided portion including a first bearing portion and a second bearing portion disposed to be spaced apart from each other in the direction of the optical axis, and
the lens unit includes a first tilt-preventing member having a linear expansion coefficient lower than a linear expansion coefficient of the lens holding member, the first tilt-preventing member being fixed to a region of the guided portion positioned between the first bearing portion and second bearing portion.

2. The lens unit according to claim 1,
wherein the region to which the first tilt-preventing member is fixed is on an inner peripheral surface of the guided portion, the region being positioned at a side of the lens in a direction intersecting the direction of the optical axis of the lens.

3. The lens unit according to claim 2,
wherein the first tilt-preventing member includes a region overlapping with a fixing portion to the lens in a state where the first tilt-preventing member is viewed in a direction perpendicular to the direction of the optical axis of the lens.

4. The lens unit according to claim 2,
wherein the guided portion has a tubular shape.

5. The lens unit according to claim 1,
wherein the first tilt-preventing member includes a region overlapping with a fixing portion to the lens in a state where the first tilt-preventing member is viewed in a direction perpendicular to the direction of the optical axis of the lens.

6. The lens unit according to claim 5,
wherein the guided portion has a tubular shape, and the first tilt-preventing member is fixed to an inner peripheral surface of the guided portion.

7. The lens unit according to claim 1,
wherein the guided portion has a tubular shape, and the first tilt-preventing member is fixed to an inner peripheral surface of the guided portion.

8. The lens unit according to claim 1,
wherein the lens is fitted to the lens holding member at a fixing portion of lens holding member and is adhered to the lens holding member by an adhesive.

9. An imaging device comprising:
the lens unit according to claim 1; and
an imaging element that images a subject through the lens.

* * * * *